United States Patent
Tezaur (10) Patent No.: US 9,262,815 B2
(45) Date of Patent: Feb. 16, 2016

(54) ALGORITHM FOR MINIMIZING LATENT SHARP IMAGE COST FUNCTION AND POINT SPREAD FUNCTION COST FUNCTION WITH A SPATIAL MASK IN A REGULARIZATION TERM

(71) Applicant: Nikon Corporation, Tokyo (JP)

(72) Inventor: Radka Tezaur, Belmont, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 14/372,518

(22) PCT Filed: Mar. 11, 2013

(86) PCT No.: PCT/US2013/030252
§ 371 (c)(1),
(2) Date: Jul. 16, 2014

(87) PCT Pub. No.: WO2013/148142
PCT Pub. Date: Oct. 3, 2013

(65) Prior Publication Data
US 2014/0355901 A1    Dec. 4, 2014

Related U.S. Application Data

(60) Provisional application No. 61/617,539, filed on Mar. 29, 2012.

(51) Int. Cl.
*G06K 9/40*    (2006.01)
*G06T 5/00*    (2006.01)

(52) U.S. Cl.
CPC ............... *G06T 5/004* (2013.01); *G06T 5/003* (2013.01); *G06T 2207/10004* (2013.01); *G06T 2207/20048* (2013.01); *G06T 2207/20201* (2013.01)

(58) Field of Classification Search
CPC ........... G06T 5/003; G06T 5/004; G06T 5/20; G06T 2207/20192; G06T 2207/20201
USPC .......................................... 382/255
See application file for complete search history.

(56) References Cited

U.S. PATENT DOCUMENTS 5,696,848 A    12/1997   Patti et al.
8,582,910 B2 *   11/2013   Zhang et al. ................... 382/255
(Continued)

FOREIGN PATENT DOCUMENTS

WO    WO2013148139 A1    10/2013
WO    WO2013148142 A1    10/2013

OTHER PUBLICATIONS

Alfonso et al. ("Fast image recovery using variable splitting and constrained optimization," IEEE Transactions on Image Processing, vol. 19, No. 9, Sep. 2010).*

(Continued)

*Primary Examiner* — Yubin Hung
(74) *Attorney, Agent, or Firm* — Roeder & Broder LLP; Steven G. Roeder (57) ABSTRACT

A method for deblurring a blurry image (18) includes utilizing a spatial mask and a variable splitting technique in the latent sharp image estimation cost function. Additionally or alternatively, the method can include the utilizing a spatial mask and a variable splitting technique in the PSF estimation cost function. The spatial mask can be in a regularization term of either or both the latent sharp image estimation cost function and the PSF cost function. The latent sharp image estimation cost function can be used for non-blind deconvolution. Alternatively, one or both cost functions can be used for blind deconvolution.

19 Claims, 5 Drawing Sheets

(56) References Cited

U.S. PATENT DOCUMENTS

| | | | |
|---|---|---|---|
| 2006/0279585 A1 | 12/2006 | Milanfar et al. | |
| 2007/0217713 A1 | 9/2007 | Milanfar et al. | |
| 2008/0175508 A1 | 7/2008 | Bando et al. | |
| 2008/0175509 A1 | 7/2008 | Wheeler et al. | |
| 2009/0046944 A1 | 2/2009 | Bilcu et al. | |
| 2010/0166332 A1 | 7/2010 | Lee et al. | |
| 2012/0042291 A1 | 2/2012 | Granik et al. | |
| 2012/0114207 A1* | 5/2012 | Riddell et al. | 382/131 |
| 2012/0155730 A1* | 6/2012 | Metaxas | G01R 33/5608 382/131 |
| 2013/0242129 A1* | 9/2013 | Harmeling et al. | 348/222.1 |

OTHER PUBLICATIONS

The International Search Report and Written Opinion for PCT/US13/30227, May 20, 2013, Nikon Corporation.

The International Search Report and Written Opinion for PCT/US13/30252, Jun. 14, 2013, Nikon Corporation (related application).

Wang et al., A New Alternating Minimization Algorithm for Total Variation Image Reconstruction, SIAM J. Imaging Sciences, vol. I, No. 3(2008), pp. 248-272, © 2008 Society for Industrial and Applied Mathematics.

Yang et al., An Efficient TVL1 Algorithm for Deblurring Multichannel Images Corrupted by Impulsive Noise, SIAM J. Sci. Comput. 31, pp. 1-20, Dept. of Mathematics, Nanjing Univ. P.R. China, Dept. of Computational and Applied Mathematics, Rice University, Houston, TX USA, 2009.

Lee et al., High-quality non-blind image deconvolution with adaptive regularization, available online Jul. 23, 2011, pp. 653-663, J. Vis. Commun. Image R. © 2011 Elsevier Inc.

Cho et al., Handling Outliers in Non-Blind Image Deconvolution, ICCV 2011.

Xu et al., Two-Phase Kernel Estimation for Robust Motion Deblurring, ECCV 2010, pp. 157-170, Part I, LNCS 6311, Department of Computer Science and Engineering, The Chinese University of Hong Kong, © Springer-Verlag Berlin Heidelberg 2010.

Dolui, et al., Blind Deconvolution of Medical Ultrasound Images Using Variable Splitting and Proximal Point Methods, Biomedical Imaging: From Nano to Macro, IEEE International Symposium, Mar. 2011.

Shan, et al., High-Quality Motion Deblurring from a Single Image, ACM SIGGRAPH, New York, NY, USA, Article 73, 2008.

Esser, Ernie, Applications of Lagrangian-Based Alternating Direction Methdods and Connections to Split Bregman, Tech Rep. 09-31, UCLA, Mar. 2009.

U.S. Appl. No. 14/372,516, filed Jul. 16, 2014, with its entire file and prosecution history.

* cited by examiner

ALGORITHM FOR MINIMIZING LATENT SHARP IMAGE COST FUNCTION AND POINT SPREAD FUNCTION COST FUNCTION WITH A SPATIAL MASK IN A REGULARIZATION TERM

RELATED APPLICATION

This application claims priority on U.S. Provisional Application Ser. No. 61/617,539, filed Mar. 29, 2012 and entitled "LATENT SHARP IMAGE COST FUNCTION AND POINT SPREAD FUNCTION COST FUNCTION WITH A SPATIAL MASK IN A REGULARIZATION TERM." As far as permitted, the contents of U.S. Provisional Application Ser. No. 61/617,539 are incorporated herein by reference.

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, the image can be blurred.

When blur is sufficiently spatially uniform, a blurred captured image can be modeled as the convolution of a latent sharp image with some point spread function ("PSF") plus noise, $$B = K*L + N. \quad \text{Equation (1)}$$

In Equation 1 and elsewhere in this document, (i) "B" represents a blurry image, (ii) "L" represents a latent sharp image, (iii) "K" represents a PSF kernel, and (iv) "N" represents noise (including quantization errors, compression artifacts, etc.).

A non-blind deconvolution problem seeks to recover the latent sharp image L only when the PSF kernel K is known. Alternatively, a blind deconvolution problem seeks to recover both the PSF kernel K and the latent sharp image L. Both the blind deconvolution problem and non-blind deconvolution problem are difficult to accurately solve because they are ill conditioned, and some information has been irretrievably lost due to zero and near zero values in the corresponding optical transfer function ("OTF"), Fourier transform of the PSF.

Further, the blind deconvolution problem is extremely difficult to solve because there are more unknowns than known variables. Further, infinitely many arrays exist that satisfy Equation (1), but only some of them make sense and are useful as solutions to the blind deconvolution problem, which seeks a PSF kernel K that characterizes blur present in the given blurry image.

Moreover, many blurry images include areas that further complicate the problem of recovering a latent sharp image L. For example, extremely bright areas where the sensor pixels reach their saturation point in the blurry image B can adversely influence the determined PSF kernel K and the resulting latent sharp image L.

Further, certain depth layers of a blurry image B will have a different blur PSF kernel. For example, consider a blurry image B that includes something in the foreground (e.g. people) and something in the background (e.g. mountains). If the main subject in the foreground is not properly focused, both the foreground and the background of the blurry image B can be blurred, but to a different degree. Considering the previous example, it may only be desired to deblur the people in the foreground, while allowing the mountains in the background to remain blurred. Additionally, many current deconvolution methods often result in a latent sharp image L having ringing artifacts around strong edges in the image and around image boundaries.

One common approach to solving a deconvolution problem includes reformulating it as an optimization problem in which suitable cost functions are minimized in order to find a solution to the deconvolution problem. For example, the blind deconvolution problem is often solved in iterations by minimizing two cost functions in alternating fashion. More specifically, the blind deconvolution problem is often solved in iterations by minimizing a latent sharp image estimation cost function, and by minimizing a PSF estimation cost function in alternating fashion. In this example, the step of minimizing the latent sharp image cost function is equivalent to solving a non-blind deconvolution problem. Further, the step of minimizing the PSF estimation cost function is similar, except the roles of the variables (K and L) are swapped.

In addition to alternating minimization of the latent sharp image estimation cost function, and the PSF estimation cost function, it is also common to use a multi-resolution approach, where first the coarse versions of the latent sharp image L and the PSF kernel K are estimated using a heavily downsampled blurry image and then these estimates are refined at higher and higher resolution, until the full resolution of the given blurred image is reached.

A relatively common type of a cost function used for deconvolution is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

Unfortunately, existing regularized least squares cost functions are not entirely satisfactory.

SUMMARY

The present invention is directed to a method for deblurring a blurry image. In one embodiment, the method includes the steps of utilizing a spatial mask in a regularization term of a latent sharp image ("LSI") estimation cost function used for deconvolution of the blurry image; and utilizing a variable splitting technique in the latent sharp image estimation cost function. Additionally or alternatively, the present invention is directed to a method for deblurring a blurry image that includes the steps of (i) utilizing a spatial mask in a regularization term of a PSF estimation cost function used to estimate a PSF blur kernel of the blurry image, and (ii) utilizing a variable splitting technique in the PSF estimation cost function.

Thus, in certain embodiments, the invention can be applied to both latent sharp image and PSF estimation cost function minimization. Further, in certain embodiments, the latent sharp image cost function and/or the PSF estimation cost function are a modified regularized least squares cost function that includes one or more fidelity terms and one or more regularization terms.

As provided herein, including a spatial mask in the regularization term of the latent sharp image estimation cost function and/or the PSF cost function makes it possible not to penalize large values of elements that should be large and to penalize more strongly large values of elements that should not be large. This can help to reduce the influence of noise in the blurry image on the estimated PSF and the reconstructed latent sharp image and to promote sharp edges in the latent sharp image. This improves the quality of the deblurred image.

Prior information about the properties of a sought latent sharp image (some natural image model) and about noise properties can be incorporated to reduce the ambiguity and to make it possible to find the desired solution.

Moreover, as provided herein, the variable splitting techniques provided herein allows for the fast minimization of the latent sharp image estimation cost function with a spatial mask, and the PSF estimation cost function with a spatial mask using fast Fourier transform. This will speed up the deblurring of images and will allow for image deblurring with less powerful processors (e.g. processors in cameras).

The present invention is also directed to a device including a control system having a processor that can perform the steps provided herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
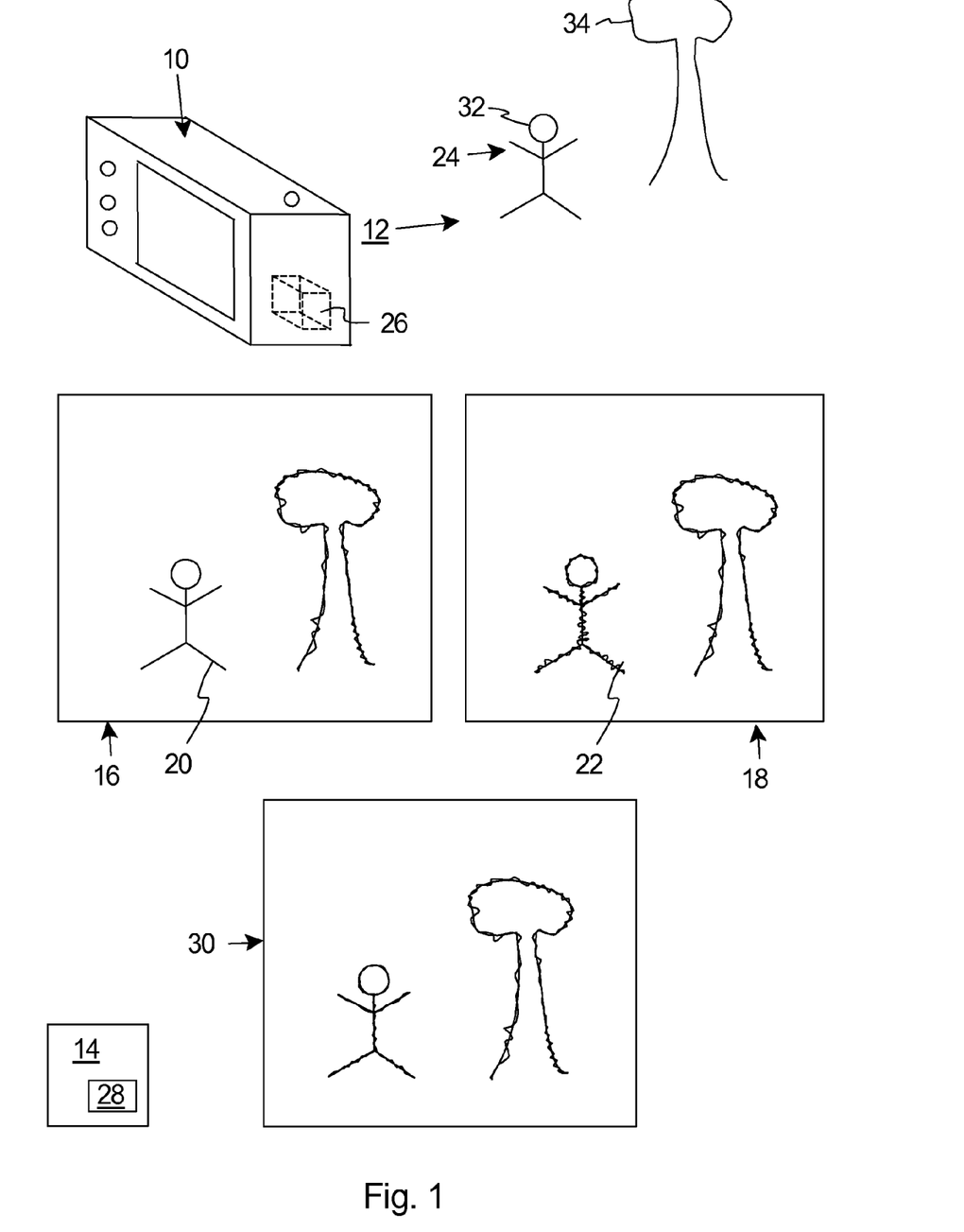
FIG. 1 is a simplified view of a scene, a computer having features of the present invention, an image apparatus having features of the present invention, a first captured image of the scene, a second captured image of the scene, and an adjusted image.

FIG. 1 is a simplified perspective view of an image apparatus 10 (e.g. a digital camera), a scene 12, and a computer 14 (illustrated as a box). FIG. 1 also illustrates a first captured image 16 (illustrated away from the image apparatus 10), and a second captured image 18 (illustrated away from the image apparatus 10) that have been captured by the image apparatus 10. In FIG. 1, the first captured image 16 is intended to illustrate a sharp image 20 (including non-wavy lines) and the second captured image 18 is intended to illustrate image blur 22 (including wavy lines). For example, movement of the image apparatus 10, and/or movement of an object 24 in the scene 12 during the capturing of the blurred image 18 can cause image blur 22. Additionally, or in the alternative, blur 22 in the image 18 can be caused by the image apparatus 10 not being properly focused when the image 18 is captured.

As an overview, in certain embodiments, the present invention is directed to (i) a unique algorithm for estimating the latent sharp image of the blurred image 18, and/or (ii) a unique algorithm for estimating a point spread function of the blurred image 18. As provided herein, a spatial mask can be used in a regularization term of a latent sharp image estimation cost function and/or a PSF estimation cost function. Including a spatial mask in the regularization term is desirable because it can help, for example, to promote sharp edges and suppress noise and ringing artifacts in the deblurred image. This improves the quality of the deblurred image.

In one embodiment, as provided herein, the image apparatus 10 can include a control system 26 that uses one or more of the algorithms for deconvoluting the blurred image 18. Alternatively, the computer 14 can include a control system 28 that uses one or more of the algorithms for deconvoluting the blurred image 18. In either event, the control system 26, 28 provides a deblurred latent sharp image 30 from the blurred image 18.

Further, the present cost functions can be efficiently minimized using fast Fourier transform ("FFT"). This will speed up the deblurring of images and will allow for image deblurring with less powerful processors (e.g. processors in cameras).

The present algorithm for deconvolution of the blurred image 18 can be used for non-blind convolution (the PSF is known). Further, the algorithm for deconvolution of the blurry image 18, and/or the algorithm for estimating a point spread function of the blurry image 18 can be used in blind convolution (both the latent sharp image and the PSF are unknown).

Additionally, in certain embodiments, the latent sharp image cost function and/or the PSF estimation cost function are a modified regularized least squares cost function that includes one or more fidelity terms and one or more regularization terms.

The type of scene 12 captured by the image apparatus 10 can vary. For simplicity, in FIG. 1, the scene 12 is illustrated as including two objects 24. Alternatively, the scene 12 can include one, or more than two objects 24. In FIG. 1, a first object 32 is a simplified stick figure of a person in the foreground of the scene 12, and a second object 34 is a simplified tree in the background of the scene 12.

In the first image 16, the person in the foreground is sharp and the tree in the background is slightly blurred. In contrast, in the second image 18, both the person and the tree are blurred. Finally, in one embodiment, during deconvolution of the blurred image 18, the sharp edges and noise in the image were masked out. As a result thereof, in the resulting latent sharp image 30 is sharper.

Each control system 26, 28 can include one or more processors and circuits. Further, either of the control systems 26, 28 can include software that utilizes one or more methods provided herein to deblur the blurry image 18.

As provided herein, the algorithms used for solving the blind deconvolution problem estimate both the PSF kernel K and the latent sharp image L. These algorithms are iterative and usually they alternate, improving the current estimates of the PSF and the latent sharp image. The steps of improving the current estimate of the PSF and the current estimate of the latent sharp image are typically in the form of solving an optimization problem. More specifically, for blind deconvolution, (i) a latent sharp image estimation cost function is formulated and minimized to find a solution for the latent sharp image estimate, and (ii) a PSF cost function is formulated and minimized to find a solution for the PSF blur kernel estimate.

One of the most common approaches to image deconvolution is reformulating it as a regularized least squares problem, as the minimization of a latent sharp image estimation cost function that has the form $$c(L) = \|K*L - B\|_2^2 + p(\|D_x*L\|_2^2 + \|D_y*L\|_2^2).$$  Equation (2)

In Equation 2, the term $\|K*L-B\|_2^2$ is considered a fidelity term that makes the latent sharp image L conform to the model in Equation (1) with the noise as small as possible. Further, in Equation 2, the terms $\|D_x*L\|_2^2$ and $\|D_y*L\|_2^2$ are considered regularization terms that help to deal with the ill-conditioned nature of the problem and noise magnification. The regularization terms can be also interpreted as a form of infusing prior information about the image. As $(\|D_x*L\|_2^2+\|D_y*L\|_2^2)$ is made small, the gradient of latent sharp image L is forced to be sparse, with most elements being zero or close to zero, which is one of the common properties exhibited by natural images.

Additionally, in Equation 2 and elsewhere in this document, (i) c(L) is the latent sharp image estimation cost function, (ii) L is the latent sharp image, (iii) K is a PSF kernel, (iv) B is a blurry image, (v) $D_x$ and $D_y$ are the first order partial derivative operators, and (vi) $\rho$ is a weight parameter that helps to a set proper balance between the fidelity and the regularization terms so as to achieve the best compromise between the sharpness of recovered latent sharp image and the noise and other artifacts present in the reconstructed image.

Further, a common PSF cost function for estimating the PSF kernel K can be re-formulated as a regularized least squares problem, as the minimization of a PSF cost function that has the form $$c(K)=\|K*D_x*L-D_x*B\|_2^2+\|K*D_y*L-D_y*B\|_2^2+\theta\|K\|_2^2. \quad \text{Equation (3)}$$

In Equation 3, the term $\|K*D_x*L-D_x*B\|_2^2$ and $\|K*D_y*L-D_y*B\|_2^2$ are considered fidelity terms that makes the latent sharp image L conform to the model in Equation (1) with the noise as small as possible. Further, in Equation 3, the term $\|K\|_2^2$ is considered a regularization term that helps to deal with ill-conditioned nature of the problem and noise magnification.

Moreover, in Equation 3, (i) c(K) is the PSF cost function for the PSF kernel, and (ii) $\theta$ is a weight parameter that helps to set a proper balance between the fidelity terms and the regularization term so as to achieve the best compromise between the sharpness of recovered latent sharp image and the noise and other artifacts present in the reconstructed image. The regularization term can be also interpreted as a form of infusing prior information about the image to deal with ill-conditioned nature of the problem and noise magnification. Including $\|K\|_2^2$ in the cost function of c(K) that is minimized to find a new estimate of PSF kernel K, forces most elements of K to be very small. It thus gives preference to sparse PSF kernels that have most elements equal to 0, which is desirable in the cases of blur such as motion blur when the non-zero elements in PSF form a curve corresponding to motion trajectory.

The fact that the differential operators tend to remove the correlation between the neighboring pixels of an image is also the reason for including derivatives in the fidelity terms of the PSF cost function c(K) that is used for estimating PSF kernel K. This helps to make estimation more robust.

The minimization of latent sharp image estimation cost function c(L), and the PSF cost function c(K) that have the form Equations (2) and (3), respectively, is a pair of regularized least squares problems. When K and L are rectangular arrays of the same size and periodic convolution is considered, both these regularized least squares problem have a closed form solution. The formulas for the solutions are $$L = F^{-1}\left(\frac{\overline{F(K)}F(B)}{|F(K)|^2 + \rho(|F(D_x)|^2 + |F(D_y)|^2)}\right) \quad \text{Equation (4)}$$

and $$K = F^{-1}\left(\frac{\overline{F(L)}(|F(D_x)|^2 + |F(D_y)|^2)F(B)}{|F(L)|^2(|F(D_x)|^2 + |F(D_y)|^2) + \theta}\right), \quad \text{Equation (5)}$$

respectively. In Equations 4 and 5, the multiplication and division of arrays are both element-wise. Further, F denotes the operator of a two dimensional Fourier transform of a rectangular array using periodic extension, which can be implemented very efficiently via fast Fourier transform. As a result thereof, these closed form formulas allow for computing of the deconvolved image and the PSF relatively quickly.

In one embodiment, as provided herein, to make the process more robust and to obtain a better solution, one or both of cost functions, the latent sharp image estimation cost function c(L) in Equation (2) and/or the PSF cost function c(K) in Equation (3)) can be modified to include a weighted mask in the regularization term of the respective cost function. Including a spatial mask in the regularization term of the respective cost function is highly desirable because it will allow, for example, to (i) promote sharp edges in the deconvoluted image, and (ii) suppress noise in smooth areas of an image.

For example, the basic latent sharp image estimation cost function in Equation (2) can be modified to include a weighted mask in the regularization term. Stated in another fashion, instead of an ordinary regularized least squares problem with the latent sharp image estimation cost function provided in Equation (2), the present invention utilizes a weighted least squares problem with the latent sharp image estimation cost function as detailed in Equation (6) below:

$$c(L)=\|(K*L-B)\|_2^2+\rho(\|N(D_x*L)\|_2^2+\|N(D_y*L)\|_2^2). \quad \text{Equation (6)}$$

In Equation 6, the term N is a spatial mask (sometimes referred to as "a first spatial mask"), e.g. an array of individual weights for individual pixels in the regularization term. In this equation, the multiplication by N is element-wise. The number of elements in the spatial mask is equal to the number of pixels in the regularization term. Further, the number of elements in the spatial mask is equal to the number of pixels in the image (actual image, extended image, upsampled image, or downsampled image). In one embodiment, the value for each element in the spatial mask can range anywhere between 0 and 1. This allows the spatial mask to be smooth, with no sharp transitions, so as not to cause artifacts in the deconvolved image. In this embodiment, a value of 0 for a given pixel will result in ignoring that particular pixel, while a value of 1 for a given pixel will result in maximum weight for that particular pixel. Alternatively, another type of weighting range or system can be used for the spatial mask.

Introducing individual pixel weights in the regularization term of the latent sharp image estimation cost function can help not to penalize certain locations where the gradient is expected to be large. This helps to promote sharp edges in the deconvolved image and to suppress noise and ringing artifacts in smooth areas of an image. For example, (i) edge pixels in the image could be given a weight of zero or approximately zero so that these edge pixels with high gradients are not penalized, and/or (ii) areas that are not classified as edges could be given a weight of one or close to one, which will suppress high gradients in those areas in the deconvolved image, and thus it will help to suppress ringing artifacts and noise in these areas. The edge pixels can be automatically identified with the control system 26, 28 utilizing an algorithm that locates edge pixels in an image.

Somewhat similarly, the PSF cost function in Equation (3) can be modified to include a weighted mask in the regularization term. Stated in another fashion, instead of an ordinary regularized least squares problem with the PSF cost function provided in Equation (3), the present invention utilizes a weighted least squares problem with the PSF cost function as detailed in Equation (7) below:

$$c(K) = \|(D_x * L * K - D_x * B)\|_2^2 + \|(D_y * L * K - D_y * B)\|_2^2 + \theta \|PK\|_2^2. \quad \text{Equation (7)}$$

In Equation 7, $D_x$ and $D_y$ are first order partial derivative kernels, and the term P is a spatial mask (sometimes referred to as the "second spatial mask") e.g. an array of weights for individual pixels in the regularization term. In this equation, the multiplication by P is element-wise. In one embodiment, the spatial mask P is a binary array consisting of elements $p_{i,j}$, $p_{i,j} = 1$ for $(i,j) \in S$ and $p_{i,j} = 0$ otherwise. Set S represents prior knowledge about the shape of the support of the PSF, i.e., the locations of its non-zero elements. One of the advantages of writing the PSF estimation cost function in this way is that there is no need to limit the values of element $p_{i,j}$ to zero or one only. As provided herein, $p_{i,j}$ can have any value between zero and one to represent the probability with which $(i,j)$ is expected not to be part of the PSF support.

The number of elements in the spatial mask P is equal to number of pixels in the regularization term. Further, the number of elements in the spatial mask P is equal to the number of pixels in the image (actual image, extended image, upsampled image, or downsampled image).

Unfortunately, including the spatial mask N in the regularization term of the latent sharp image estimation cost function makes it impossible to derive a closed form formula for the minimum of the latent sharp image estimation cost function in Equation (6), analogous to Equation (4). Similarly, including the spatial mask P in the regularization term of the PSF estimation cost function makes it impossible to derive a closed form formula for the minimum of the PSF estimation cost function in Equation (7), analogous to Equation (5). As provided herein, the key to deriving those formulas is the block circulant cirulant block (BCCB) structure of the matrices representing the periodic convolution of an image with a PSF and the derivative kernels, and the fact that Fourier transform matrix can be used to diagonalize such matrices. The element-wise multiplication by the spatial masks spoils the BCCB structure. A different technique thus needs to be used to quickly find the minimum of the cost functions in Equations (6) and (7).

The present invention discloses the use of a splitting technique that makes it possible to minimize efficiently the cost function of Equations (6) and (7) with the spatial masks.

In one embodiment, the present invention modifies Equation (6) to add two auxiliary arrays, and a penalty term to the regularization terms. This helps to split the operations of convolution and element-wise multiplication by the spatial mask between different terms. The BCCB structure of convolution is then preserved and can be exploited to develop a fast method for finding the minimum. With this design, Equation (6) can be rewritten as a new cost function having the form $$\tilde{c}(L, W_x, W_y) = \|K * L - B\|_2^2 + \rho(\|NW_x\|_2^2 + \|NW_y\|_2^2) + \eta(\|W_x - D_x * L\|_2^2 + \|W_y - D_y * L\|_2^2)). \quad \text{Equation (8)}$$

In Equation (8), (i) auxiliary array $W_x$ has replaced partial derivative $D_x * L$ and auxiliary array $W_y$ has replaced partial derivative $D_y * L$ in the regularization terms of Equation (6); (ii) the penalty terms, $\|W_x - D_x * L\|_2^2$ and $\|W_y - D_y * L\|_2^2$ have been added; and (iii) the weight parameter $\eta$ has been added to help balance the influence of the penalty terms.

Further, it should be noted that Equation (8) can be minimized iteratively, by alternating minimization over $W_x$, $W_y$, and L. In all three cases, a closed form formula for the minimum exists that can be easily evaluated. In certain embodiments, it is common to increase the parameter $\eta$ during iterating minimization over $W_x$, $W_y$, and L in alternating fashion.

In case of the minimization over $W_x$, the minimum of $$\rho(\|NW_x\|_2^2 + \eta\|W_x - D_x * L\|_2^2). \quad \text{Equation (9)}$$

needs to be found since the remaining terms in $\tilde{c}(L, W_x, W_y)$ in Equation (8) are constant with respect to $W_x$. The solution of this minimization problem is $$W_x = \frac{D_x * L}{1 + (1/\eta)N^2}. \quad \text{Equation (10)}$$

Analogously, in the case of Wy, function $$\rho(\|NW_y\|_2^2 + \eta\|W_y - D_y * L\|_2^2). \quad \text{Equation (11)}$$

needs to be minimized and the closed form formula for the minimum is $$W_y = \frac{D_y * L}{1 + (1/\eta)N^2}. \quad \text{Equation (12)}$$

In case of L, it is necessary to find the minimum of $$\|K * L - B\|_2^2 + \rho\eta(\|W_x - D_x * L\|_2^2 + \|W_y - D_y * L\|_2^2) \quad \text{Equation (13)}$$

needs to be found as the terms $\|NW_x\|_2^2$ and $\|NW_y\|_2^2$ are constant with respect to L. The solution is given by formula $$L = F^{-1}\left(\frac{\overline{F(K)}F(B) + \rho\eta(\overline{F(D_x)}F(W_x) + \overline{F(D_y)}F(W_y))}{|F(K)|^2 + \rho\eta(|F(D_x)|^2 + |F(D_y)|^2)}\right). \quad \text{Equation (14)}$$

Thus, the FFT can be used to minimize the latent sharp image estimation cost function with a weight mask N in the regularization term(s). With the present invention, an auxiliary variable is introduced to the latent sharp image estimation cost function to split the regularization term involving a spatial mask N. As a result thereof, the cost function can be minimized by following a simple algorithm that takes advantage of FFT. The proposed technique allows for minimizing the cost function quickly, by following a simple iterative algorithm that can produce a solution in only a few iterations and the implementation of which can be sped up by using FFT.

It should be noted that embodiments provided herein are merely non-exclusive examples, and that modifications to the latent sharp image estimation cost function are possible. For example, in Equation (8) above, the 2-norm (the square root of the sum of squares) can be replaced by 1-norm (the sum of absolute values, total variation). Using 1-norm instead of 2-norm is believed to help to promote sparseness more strongly. In comparison with 2-norm, 1-norm tends to make most elements smaller while allowing a few elements to be bigger. 1-norm is believed by some to reflect the properties of natural images more accurately and to help to improve the quality of deblurred images, because it allows for sharper edges.

In case of 1-norm instead of 2-norm in regularization term, the latent sharp image estimation cost function of Equation (8) with auxiliary variables and a penalty term can be rewritten to have the form of:

$$\tilde{c}(L, W_x, W_y) = \|K*L - B\|_2^2 + \rho(\|NW_x\|_1 + \|NW_y\|_1) + \eta(\|W_x - D_x*L\|_2^2 + \|W_y - D_y*L\|_2^2)). \quad \text{Equation (15)}$$

The only terms in the latent sharp image estimation cost function of Equation (15) that differ from the latent sharp image cost function in Equation (8) are $\|NW_x\|_1$ and $\|NW_y\|_1$. Since both of them are independent of L, the formula for the minimum of $\tilde{c}(L, W_x, W_y)$ with respect to L is exactly the same as in the case of 2-norm, see Equation (14). To minimize $\tilde{c}(L, W_x, W_y)$ over $W_x$, one needs to minimize the function $$\rho(\|NW_x\|_1 + \eta(\|W_x - D_x*L\|_2^2). \quad \text{Equation (16)}$$

The closed form formula for the minimum is $$W_x = \text{sign}(D_x*L)\max\left(|D_x*L| - \frac{1}{2\eta}N, 0\right). \quad \text{Equation (17)}$$

Analogously, to minimize $\tilde{c}(L, W_x, W_y)$ over $W_y$, one needs to minimize the function $$\rho(\|NW_y\|_1 + \eta(\|W_y - D_y*L\|_2^2). \quad \text{Equation (18)}$$

and the closed form formula for the minimum is $$W_y = \text{sign}(D_y*L)\max\left(|D_y*L| - \frac{1}{2\eta}N, 0\right). \quad \text{Equation (19)}$$

The operation described by Equations (17) and (19) are commonly referred to as soft thresholding. With a soft thresholding operation, all elements whose absolute value is less than the threshold are set to zero (0), while the absolute value of all the remaining elements is reduced by the value of the threshold.

Alternatively, when there is a single regularization term $\rho\|G*L\|_2^2$ in the latent sharp image estimation cost function, there needs to be only one auxiliary variable ("W") and one penalty term. The formula for computing W is analogous to Equations (10) and (12), $$W = \frac{G*L}{1 + (1/\eta)N^2}. \quad \text{Equation (20)}$$

The formula for computing L becomes $$L = F^{-1}\left(\frac{\overline{F(K)}F(B) + \rho\eta\overline{F(G)}F(W)}{|F(K)|^2 + \rho\eta|F(G)|^2}\right). \quad \text{Equation (21)}$$

Still alternatively, when there are additional regularization terms in the latent sharp image estimation cost function involving higher order derivatives, the appropriate number of auxiliary variables and penalty terms need to be introduced. For example, in one embodiment, the latent sharp image estimation cost function can be rewritten so that each regularization term includes an auxiliary variable and a penalty term. The formulas for evaluating auxiliary variables are then analogous to Equations (10) and (12) or (17) and (19), depending on whether 2- or 1-norm is used. Further, the formula for computing the latent sharp image estimate L is similar to (14), with an extra term in both the numerator and the denominator for each regularization term.

In yet another embodiment, the latent sharp image estimation cost function can be rewritten so that 1-norm is used in the fidelity term instead of 2-norm. In this embodiment, the fidelity term can be split in a similar fashion as the regularization terms described above.

In still another embodiment, the latent sharp image estimation cost function can be written with additional fidelity terms involving image derivatives and 2-norm in the fidelity terms. In this example, the formulas for the auxiliary variables do not change, as the extra fidelity terms are independent of the auxiliary variables. The only formula that changes is the one for L. It changes in the similar fashion as in the case without spatial masks. In the resulting formula, there are extra terms containing $|F(D)|^2$ (where D is the appropriate derivative operator) both in the numerator and the denominator.

In yet another embodiment, the latent sharp image estimation cost function can be written with a spatial mask in both the fidelity term and the regularization term. The spatial mask in the fidelity term allows restricting deconvolution to an area of arbitrary shape. For example, with the spatial mask in fidelity term of the latent sharp image estimation cost function, it possible to apply deblurring only to a selected part of an image (such as a single object) or to avoid some areas where the convolution blurring model (1) fails that cause problems (such as oversaturated highlights). Another application is the suppression of ringing artifacts around image borders.

As provided herein, the same variable splitting techniques can be applied to the latent sharp image estimation cost function having a spatial mask in both the fidelity term(s) and the regularization term(s) to allow for treating areas of arbitrary shape, yet still working with rectangular arrays. This will allow for the use of fast Fourier transform ("FFT") for fast implementation. More specifically, a relatively simple latent sharp image estimation cost function having a spatial mask in both the fidelity term and the regularization terms can be written as follows:

$$c(L) = \|M(K*L - B)\|_2^2 + \rho(\|N(D_x*L)\|_2^2 + \|N(D_y*L)\|_2^2. \quad \text{Equation (22)}$$

Basically, Equation 22 is the result of modifying Equation (2) to include a first spatial mask M in the fidelity term and the second spatial mask N in the regularization terms. As provided herein, in certain embodiments, to allow for fast implementation, both the fidelity and the two regularization terms need to be split. In this example, the new latent sharp image estimation cost function with auxiliary variables and penalty terms can be rewritten as follows:

$$\tilde{c}(L, R, W_x, W_y) = \|MR\|_2^2 + \alpha\|R - (K*L - B)\|_2^2 + \rho(\|NW_x\|_2^2 + \|NW_y\|_2^2) + \eta(\|W_x - D_x*L\|_2^2 + \|W_y - D_y*L\|_2^2)) \quad \text{Equation (23)}$$

Comparing Equation (23) to Equation (22), (i) auxiliary array R has replaced (K*L−B) in the fidelity term, (ii) the penalty term $\|R - (K*L - B)\|_2^2$ has been added to the fidelity term; (iii) the weight parameter α has been added to help balance the influence of the penalty term added to the fidelity term; (iv) $W_x$ has replaced partial derivative $D_x*L$ in the first regularization term, (v) auxiliary array $W_y$ has replace partial derivative $D_y*L$ in the second regularization term; (vi) the penalty terms $\|W_x - D_x*L\|_2^2$ and $\|W_y - D_y*L\|_2^2$ have been added to the regularization term; and (vi) the weight parameter η has been added to help balance the influence of the penalty terms added to the regularization term.

To find the minimum of this new cost function of Equation (23), minimization over R, $W_x$, $W_y$, and L is performed iteratively, in alternating fashion. For each of these partial minimization problems a closed form formula exists. The formulas are, respectively:

$$R = \frac{K*L-B}{1+(1/\alpha)M^2} \quad \text{Equation (24)}$$

$$W_x = \frac{D_x*L}{1+(1/\eta)N^2} \quad \text{Equation (25)}$$

$$W_y = \frac{D_y*L}{1+(1/\eta)N^2} \quad \text{Equation (26)}$$

$$L = F^{-1}\left(\frac{\alpha\overline{F(K)}F(R+F(B))+\rho\eta(\overline{F(D_x)}F(W_x)+\overline{F(D_y)}F(W_y))}{\alpha|F(K)|^2+\rho\eta(|F(D_x)|^2+|F(D_y)|^2)}\right) \quad \text{Equation (27)}$$

Thus, the FFT can be used to minimize the latent sharp image estimation cost function with a weight mask in both the fidelity term and regularization terms $W_x$, $W_y$. It should be noted that the formulas for R, $W_x$, and $W_y$ are the same as in the cases when there is a spatial mask only either in the fidelity or in the regularization terms (for example, for $W_x$ and $W_y$ see equations (10) and (12)).

In yet another embodiment, it is possible to use 1-norm instead of 2-norm in the latent shape image estimation cost function having a weight mask in both the fidelity term and regularization terms. In this embodiment, the formulas for R, $W_x$ and $W_y$ then change to soft thresholding as described above with reference to Equations (17) and (19)).

In still another embodiment, latent sharp image cost functions with multiple fidelity terms involving image derivatives or using other regularization terms can also be used. The ways of dealing with these modifications are similar as in the case of a spatial mask in only fidelity terms or only in regularization terms which have been described earlier.

Somewhat similarly, the present invention teaches that a spatial mask can be added to a PSF estimation cost function, and that it is possible to use the FFT solution to minimize the PSF estimation cost function with the spatial mask. More specifically, Equation (7) above details a PSF estimation cost function that includes a spatial mask in the regularization term. In certain embodiments, the spatial mask has zeros where high values are expected (if PSF support is known, approximately) and ones where small values are expected (areas that are believed not to be part of the support of the PSF).

In one embodiment, the present invention modifies Equation (7) to add an auxiliary array, and a penalty term to the regularization term. This helps to split the operations of convolution and element-wise multiplication by the spatial mask between different terms. The BCCB structure of convolution is then preserved and can be exploited to develop a fast method for finding the minimum. With this design, Equation (7) can be rewritten as a new cost function having the form:

$$\tilde{c}(K,Z) = \|(D_x*L*K-D_x*B)\|_2^2 + \|(D_y*L*K-D_y*B)\|_2^2 + \theta(\|PZ\|_2^2 + \gamma\|Z-K\|_2^2). \quad \text{Equation (28)}$$

In Equation (28), (i) auxiliary array Z has replaced K in the regularization term of Equation (7); (ii) a penalty term $\|Z-K\|_2^2$ has been added; and (iii) a weight parameter $\gamma$ has been added to help to achieve a proper balance between the penalty term and the rest of the PSF cost function. Near the minimum of the new PSF cost function of Equation (28), the penalty term, $\|Z-K\|_2^2$ has to be small. This makes $Z \approx K$ and $\tilde{c}(K,Z) \approx c(K)$. The PSF kernel K that minimizes $\tilde{c}(K,Z)$ is thus close to the one that minimizes $c(K)$.

It should be noted that Equation (28) can be minimized iteratively, by alternating minimization over Z and K. In these cases, a closed form formula for the minimum exists that can be easily evaluated.

In case of the minimization over Z, the minimum of the following function needs to be found:

$$\theta(\|PZ\|_2^2 + \gamma\|Z-K\|_2^2). \quad \text{Equation (29)}$$

The remaining terms in $\tilde{c}(K,Z)$ are independent of Z. The minimum of this function is given by the following formula:

$$Z = \frac{K}{1+(1/\gamma)P^2}. \quad \text{Equation (30)}$$

In case of the minimization over K, the minimum of the following function needs to be found:

$$\|(D_x*L*K-D_x*B)\|_2^2 + \|(D_y*L*K-D_y*B)\|_2^2 + \theta\gamma\|Z-K\|_2^2, \quad \text{Equation (31)}$$

as the term $\|PZ\|_2^2$ in $\tilde{c}(K,Z)$ is independent of K.

Since this function involves only 2-norm, there is a closed formula for its minimum, $$K = F^{-1}\left(\frac{\overline{F(L)}(|F(D_x)|^2+|F(D_y)|^2)F(B)+\theta\gamma F(Z)}{|F(L)|^2(|F(D_x)|^2+|F(D_y)|^2)+\theta\gamma}\right). \quad \text{Equation (32)}$$

As provided herein, the iterative minimization process that alternates minimization over Z and K is very efficient because the fast Fourier transform can be used to implement Equation (32) and usually only a few iterations are needed.

It should also be noted that embodiments provided herein are merely non-exclusive examples, and that modifications to the point spread function estimation cost function are possible. For example, in Equation (28) above, the 2-norm (the square root of the sum of squares) can be replaced by 1-norm (the sum of absolute values, total variation). Using 1-norm instead of 2-norm is believed to help to promote sparseness more strongly. More specifically, in this example, Equation (7) can be modified with the following new PSF estimation cost function having the form:

$$\tilde{c}(K,Z) = \|(D_x*L*K-D_x*B)\|_2^2 + \|(D_y*L*K-D_y*B)\|_2^2 + \theta(\|PZ\|_1 + \gamma\|Z-K\|_2^2). \quad \text{Equation (33)}$$

In Equation (33), (i) auxiliary array Z has replaced K in the regularization term of Equation (7); (ii) a penalty term $\|Z-K\|_2^2$ has been added; and (iii) a weight parameter $\gamma$ has been added to help to achieve a proper balance between the penalty term and the rest of the PSF cost function. Near the minimum of the new PSF cost function of Equation (33), the penalty term, $\|Z-K\|_2^2$ has to be small. This makes $Z \approx K$ and $\tilde{c}(K,Z) \approx c(K)$. The PSF kernel K that minimizes $\tilde{c}(K,Z)$ is thus close to the one that minimizes $c(K)$.

Although the new cost function in Equation (33) looks more complicated, it is easier to minimize. For example, it can be minimized efficiently in an iterative fashion, by alternating minimization over to K and Z. In this embodiment, each of these two partial minimization problems is relatively easy to solve, as there exists a closed form formula for the solution.

More specifically, in case of the minimization over Z, the minimum of the following function needs to be found:

$$\theta(\|PZ\|_1 + \gamma\|Z-K\|_2^2). \quad \text{Equation (34)}$$

The remaining terms in $\tilde{c}(K,Z)$ are independent of Z. The minimum of this function is given by the following formula:

$$Z = \text{sign}(K)\max\left(|K| - \frac{1}{2\gamma}P, 0\right). \quad \text{Equation (35)}$$

The operation described by this formula is commonly referred to as soft thresholding, which is described above with relation to Equations (17) and (19) Equation (35) can be rewritten as follows:

$$Z = sthr\left(K, \frac{1}{2\gamma}P\right). \quad \text{Equation (36)}$$

The first argument is the array that is to be thresholded, the second argument is the array of thresholds (which are applied element-wise).

In case of the minimization over K, the minimum of the following function needs to be found:

$$\|(D_x*L*K-D_x*B)\|_2^2 + \|(D_y*L*K-D_y*B)\|_2^2 + \theta\gamma\|Z-K\|_2^2 \quad \text{Equation (37)}$$

as the term $\|PZ\|_1$ in $\tilde{c}(K,Z)$ is independent of K. Since this function involves only 2-norm, there is a closed formula for its minimum, $$K = F^{-1}\left(\frac{\overline{F(L)}(|F(D_x)|^2 + |F(D_y)|^2)F(B) + \theta\gamma F(Z)}{|F(L)|^2(|F(D_x)|^2 + |F(D_y)|^2) + \theta\gamma}\right). \quad \text{Equation (38)}$$

As provided herein, the iterative minimization process that alternates minimization over Z and K is very efficient because the fast Fourier transform can be used to implement Equation (38) and usually only a few iterations are needed.

Additionally, in certain embodiments, it is desired to estimate the PSF not only for motion blur, but also for other types of blur, including defocus blur. For defocus blur, the shape of PSF is close to a disk. Thus, the PSF is considerably less sparse than a motion blur PSF. But the gradient of such PSF is very sparse. Thus, in certain embodiments, it is desired to use a PSF cost function with regularization terms involving the gradient of PSF.

However, when both fidelity and regularization terms of the PSF cost function use a gradient, the denominator in the formula for computing K analogous to Equation (38) contains zeros at some frequencies. In order to prevent this, in certain embodiments, the present invention teaches a PSF cost function that consists of fidelity and regularization terms with and without derivatives, where the weight of each term can be set appropriately, to prevent zeros in the denominator and to suit the needs of the image being deblurred.

In one non-exclusive embodiment, the proposed PSF cost function can have the following form:

$$c(K) = \omega\|L*K-B\|_2^2 + \xi(\|D_x*L*K-D_x*B\|_2^2 + \|D_y*L*K-D_y*B\|_2^2) + \theta\|P_1 K\|_q^q + \sigma(\|P_2(D_x*K)\|_q^q + \|P_2(D_y*K)\|_q^q) \quad \text{Equation (39)}$$

In Equation (39), in certain embodiments, (i) $P_1$ and $P_2$ are two spatial masks with elements ranging from 0 to 1, and (ii) q can be either 1 or 2. Alternatively, q can be different from 1 and 2. For example, q can be less than one (q<1) or between 1 and 2. However, q different from 1 and 2 can require solving complicated non-linear equations to find the auxiliary variable values. As an example, $q=\frac{2}{3}$ can be simplified to solving a 4-th order equation. This can be implemented by lookup tables.

It should be noted that 1-norm promotes sparseness more strongly. Further, in Equation 39, (i) $\|L*K-B\|_2^2$ is the fidelity term; (ii) $\omega$, $\xi$, $\theta$, and $\sigma$ are weight parameters that is used to achieve a proper balance of the different terms in the cost function; (iii) $\|D_x*L*K-D_x*B\|_2^2$ and $\|D_y*L*K-D_y*B\|_2^2$ are fidelity terms; and (iv) $\|P_1 K\|_q^q$, $\|P_2(D_x*K)\|_q^q$, and $\|P_2(D_y*K)\|_q^q$ are regularization terms. Thus, the PSF cost function in Equation (39) includes three regularization terms.

In one embodiment, utilizing the variable splitting technique provided herein, three auxiliary variables, Z, $Z_x$ and $Z_y$, and three penalty terms, $\|Z-K\|_2^2$, $\|Z_x-D_x*K\|_2^2$, and $\|Z_y-D_y*K\|_2^2$ are added to Equation (39) to achieve the following new PSF cost function:

$$\tilde{c}(K,Z,Z_x,Z_y) = \omega\|L*K-B\|_2^2 + \xi(\|D_x*L*K-D_x*B\|_2^2 + \|D_y*L*K-D_y*B\|_2^2) + \theta(\|P_1 Z\|_q^q + \gamma\|Z-K\|_2^2) + \sigma(\|P_2 Z_x\|_q^q + \|P_2 Z_y\|_q^q + \delta(\|Z_x-D_x*K\|_2^2 + \|Z_y-D_y*K\|_2^2)). \quad \text{Equation (40)}$$

The PSF estimation cost function in Equation (40) can be minimized efficiently in an iterative fashion, by alternating minimization over $Z, Z_x, Z_y$, and K.

To minimize $\tilde{c}(K,Z,Z_x,Z_y)$ over Z, we need to find the minimum of the following function:

$$\theta(\|P_1 Z\|_q^q + \gamma\|Z-K\|_2^2). \quad \text{Equation (41)}$$

When q=1, the minimum is $$Z = sthr\left(K, \frac{1}{2\gamma}P_1\right). \quad \text{Equation (42)}$$

When q=2, the minimum is $$Z = \frac{K}{1/\gamma P_1^2}. \quad \text{Equation (43)}$$

Similarly, to minimize $\tilde{c}(K,Z,Z_x,Z_y)$ over $Z_x$ and $Z_y$, we need to find the minimum of the following functions:

$$\sigma(\|P_2 Z_x\|_q^q + \delta\|Z_x-D_x*K\|_2^2) \quad \text{Equation (44)}$$

and $$\sigma(\|P_2 Z_y\|_q^q + \delta\|Z_y-D_y*K\|_2^2) \quad \text{Equation (45)}$$

respectively. When q is equal to one (q=1), the minima are $$Z_x = sthr\left(D_x*K, \frac{1}{2\delta}P_2\right), \text{ and} \quad \text{Equation (46)}$$

$$Z_y = sthr\left(D_y*K, \frac{1}{2\delta}P_2\right). \quad \text{Equation (47)}$$

Alternatively, when q is equal to two (q=2), the minima are $$Z_x = \frac{D_x*K}{1/\delta P^2}, \text{ and} \quad \text{Equation (48)}$$

$$Z_y = \frac{D_y*K}{1/\delta P^2}. \quad \text{Equation (49)}$$

To minimize $\tilde{c}(K,Z,Z_x,Z_y)$ over K, we need to find the minimum of the function:

$$\omega\|L*K-B\|_2^2 + \xi(\|D_x*L*K-D_x*B\|_2^2 + \|D_y*L*K-D_y*B\|_2^2) + \theta\gamma\|Z-K\|_2^2 + \sigma\delta(\|Z_x-D_x*K\|_2^2 + \|Z_y-D_y*K\|_2^2))$$

Equation (50)

The solution to this minimization problem is $$K = F^{-1}\left(\frac{\overline{F(L)}(\omega + \xi(|F(D_x)|^2 + |F(D_y)|^2))F(B) + \theta\gamma F(Z) + \sigma\delta(\overline{F(D_x)}F(Z_x) + \overline{F(D_y)}F(Z_y))}{|F(L)|^2(\omega + \xi(|F(D_x)|^2 + |F(D_y)|^2)) + \theta\gamma + \sigma\delta(|F(D_x)|^2 + |F(D_y)|^2)}\right).$$

Equation (51).

Thus, a fast Fourier solution to the PSF estimation cost function with a weight mask is possible.

Further, as provided herein, the same variable splitting techniques can be applied to the PSF estimation cost function having a spatial mask in both the fidelity term(s) and the regularization term(s) to allow limiting PSF estimation to a region of arbitrary shape, yet still working with rectangular arrays. This will allow for the use of fast Fourier transform ("FFT") for fast implementation.

In one non-exclusive embodiment, the proposed PSF cost function can have the following form:

$$c(K) = \|Q(D_x*L*K - D_x*B)\|_2^2 + \|Q(D_y*L*K - D_y*B)\|_2^2 + \theta\|PK\|_2^2$$

Equation (52)

After splitting, the cost function can be expressed as follows:

$$c(K,R_x,R_y,Z) = \|QR_x\|_2^2 + \|QR_y\|_2^2 + \beta(\|R_x - (D_x*L*K - D_x*B)\|_2^2 + \|R_y - (D_y*L*K - D_y*B)\|_2^2) + \theta(\|PZ\|_2^2 + \gamma\|Z-K\|_2^2).$$

Equation (53)

To find Z, the minimum of $\theta(\|PZ\|_2^2 + \gamma\|Z-K\|_2^2)$ needs to be found. The remaining terms in $c(K,R_x,R_y,Z)$ are independent of Z. The minimum of this function is given by the following formula:

$$Z = \frac{K}{1 + (1/\gamma)P^2}.$$

Equation (54)

It should be noted that this is the same as in the case without the mask in the fidelity terms.

To find $R_x$, the minimum of the following function needs to be found:

$$\|QR_x\|_2^2 + \beta\|R_x - (D_x*L*K - D_x*B)\|_2^2$$

Equation (55)

The closed form formula is $$R_x = \frac{D_x*L*K - D_x*B}{1 + (1/\beta)Q^2}.$$

Equation (56)

To find $R_y$, the minimum of the following function needs to be found:

$$\|QR_y\|_2^2 + \beta\|R_y - (D_y*L*K - D_y*B)\|_2^2$$

Equation (57)

The closed form formula is of Equation 57 is as follows:

$$R_y = \frac{D_y*L*K - D_y*B}{1 + (1/\beta)Q^2}.$$

Equation (58)

To find K, the minimum of the following function needs to be found:

$$\beta(\|R_x - (D_x*L*K - D_x*B)\|_2^2 + \|R_y - (D_y*L*K - D_y*B)\|_2^2) + \theta\gamma\|Z-K\|_2^2)$$

Equation (59)

The solution to this minimization problem is:

$$K = F^{-1}\left(\frac{\beta\overline{F(L)}((|F(D_x)|^2 + |F(D_y)|^2)F(B) + (\overline{F(D_x)}F(R_x) + \overline{F(D_y)}F(R_y)) + \theta\gamma F(Z)}{\beta|F(L)|^2(|F(D_x)|^2 + |F(D_y)|^2) + \theta\gamma}\right).$$

Equation 60.

It should be noted that these formulas can be modified similarly as in the other cases, for example by swapping 2-norm for 1-norm, or by including more fidelity and/or regularization terms.

Figure 2:
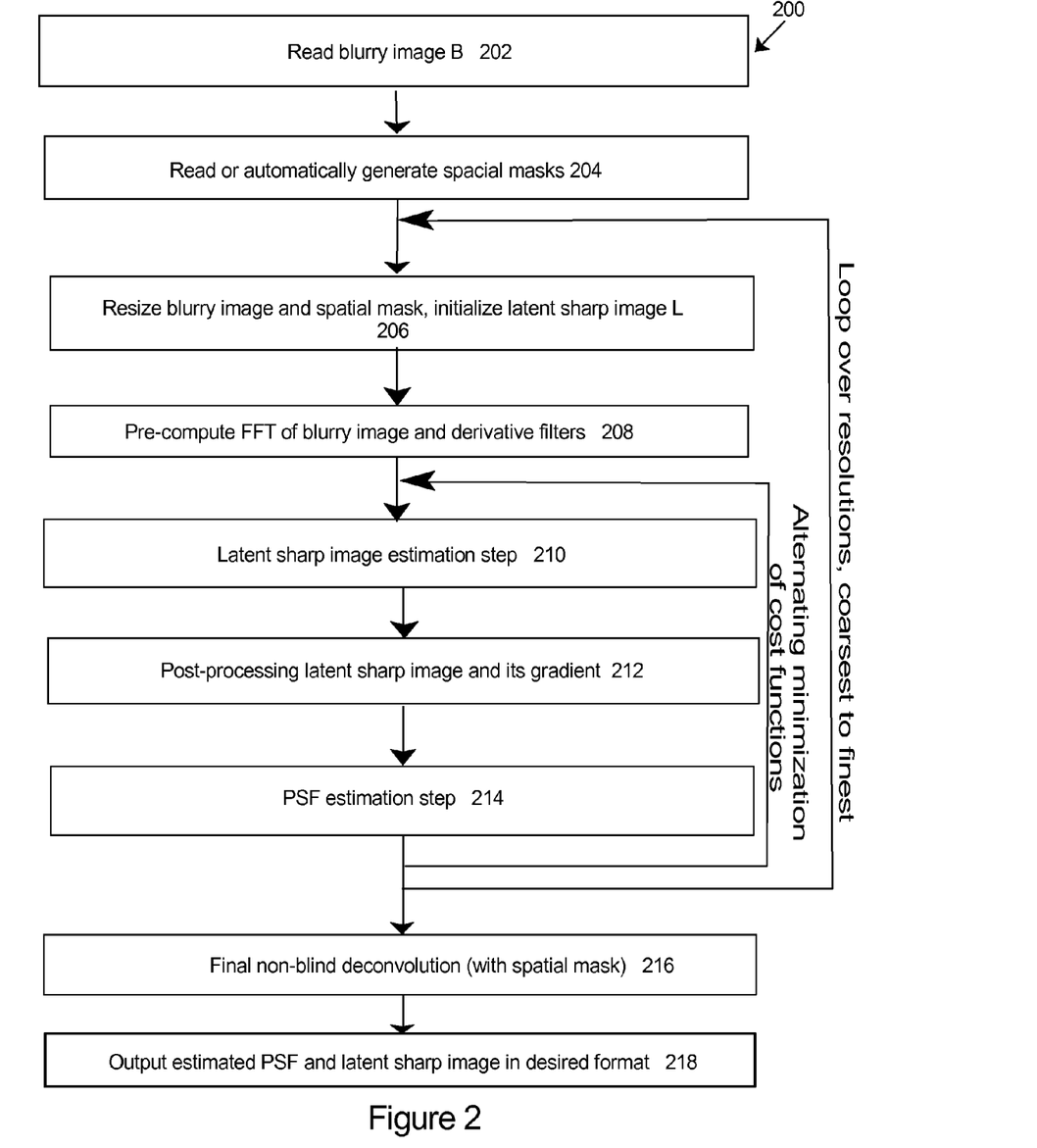
FIG. 2 is a flow chart that illustrates one embodiment of an image deblurring method having features of the present invention.

FIG. 2 is a flow chart that illustrates one non-exclusive embodiment of a blind deconvolution algorithm 200 with a spatial mask. In this embodiment, at step 202, the blurry image B is read. The entire image can be analyzed, or to save computation time, a grayscale patch of the blurry image B can be generated for PSF estimation. As provided herein, often only a portion of the blurry image or one of color channels of the blurry images is initially utilized so as to save computation time. Subsequently, the deconvolution of the entire blurry image is performed separately, at the end.

Next, at step 204, a first spatial mask and/or a second spatial mask is read, automatically generated, or generated by the user. For example, the user can manually generate one or more spatial masks using a mouse of the computer to select arbitrary shape or select one or more objects or areas in an image. Alternatively, the spatial masks can be generated by software that identifies sharp edges, and image boundaries.

Subsequently, at step 206, the blurry image and the spatial masks can be resized and the latent sharp image L is initialized.

Next, at step 208, the FFT of the blurry image and the derivative filters are pre-computed.

At step 210, the latent sharp image is estimated. A more detailed discussion of latent sharp image estimation is provided in below and illustrated in FIG. 4.

Subsequently, at step 212, the latent sharp image is post-processed. For example, this step can include denoising and/or sharpening.

Next, at step 214, the PSF is estimated. A more detailed discussion of PSF estimation is provided below and illustrated in FIG. 3.

In one embodiment, the PSF estimation and the latent sharp image estimation can be solved in iterations by minimizing the PSF estimation cost function, and by minimizing the latent sharp image estimation cost function in alternating fashion. Thus, steps 210-214 are repeated alternating the minimization of the PSF estimation cost function and the latent sharp image estimation cost function.

In addition to alternating minimization of the PSF estimation cost function, and the latent sharp image estimation cost function, it is also common to use a multi-resolution approach, where first the coarse versions of the latent sharp image L and the PSF kernel K are estimated using a heavily downsampled blurry image, and then these estimates are refined at higher and higher resolution, until the full resolution of the given blurred image is reached. Thus, the steps 206-214 are repeated starting at the coarsest resolution and moving to finer and finer resolutions. The number of iterations for each resolution can be varied to achieve desired of deblurring.

After the final PSF blur kernel is determined, at step 216, the final deconvolution is performed on the blurry image with the spatial mask utilizing the final PSF blur kernel.

Finally, at step 218, the PSF and the latent sharp image is output in the desired format.

Figure 3:
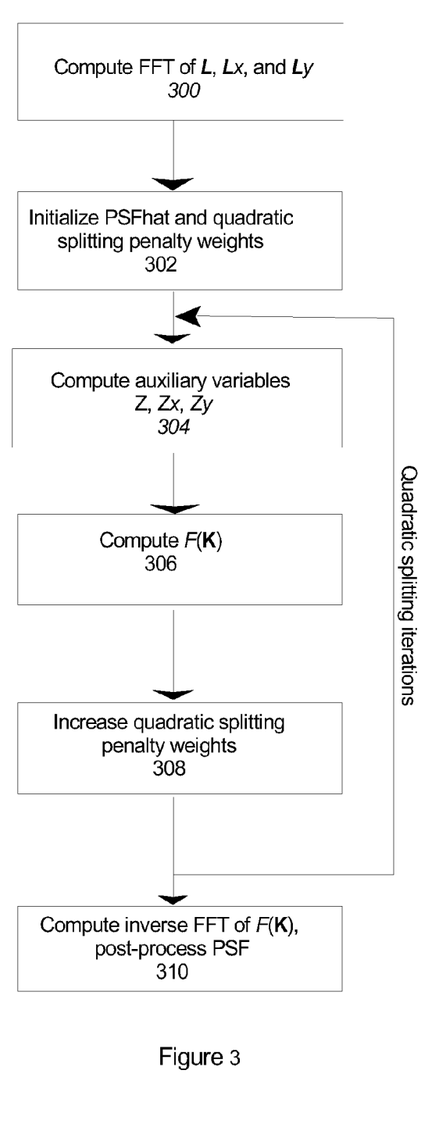
FIG. 3 is a flow chart that illustrates one embodiment of a PSF blur kernel estimation step.

FIG. 3 is a flow chart that illustrates one, non-exclusive embodiment of PSF estimation step 214. First, at step 300, the fast Fourier transform of L, $L_x$, and $L_y$ are computed.

Next, at step 302, the PSFhat and quadratic splitting penalty weights are initialed.

Subsequently, at step 304, the auxiliary variables Z, $Z_x$, and $Z_y$ are computed. For example, these variables can be computed utilizing Equations (37) through (44), respectively.

At step 306, the F(K) is estimated. For example, Equation (46) can be used to estimate F(K).

Next, at step 308, the quadratic splitting penalty weights are increased.

Step 304-308 are repeated for quadratic splitting iterations.

Subsequently, at step 310, the inverse FFT of F(K) is computed, and the PSF is post-processed.

Figure 4:
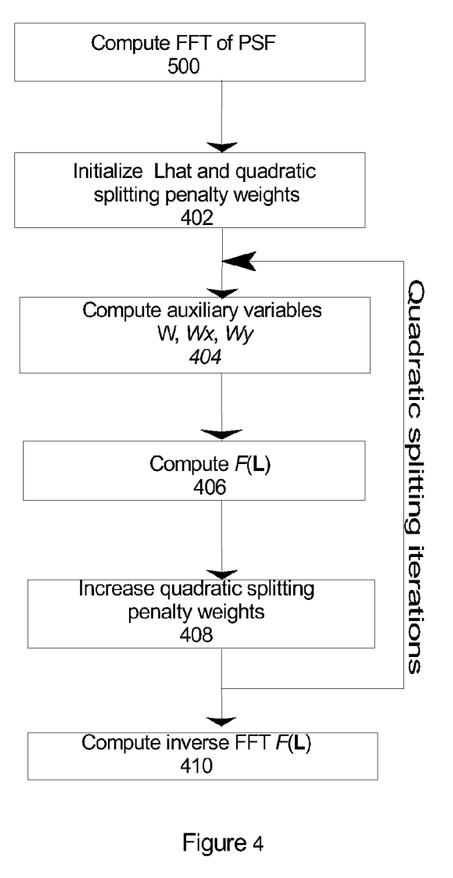
FIG. 4 is a flow chart that illustrates one embodiment of a latent sharp image estimation step.

FIG. 4 is a flow chart that illustrates one embodiment of Latent sharp image estimation step 210. First, at step 400, the FFT of PSF is computed.

Next, at step 402, the F(L) and quadratic splitting penalty weights are initialed.

Subsequently, at step 404, the auxiliary variables $W_x$, and $W_y$ are computed. For example, these variables can be computed utilizing Equations (17) and (19), respectively.

At step 406, the F(L) is computed. For example, Equation (21) can be used to estimate F(L).

Next, at step 408, the quadratic splitting penalty weights are increased.

Step 404-408 are repeated for quadratic splitting iterations.

Subsequently, at step 410, the inverse FFT of F(L) is computed.

Figure 5A:
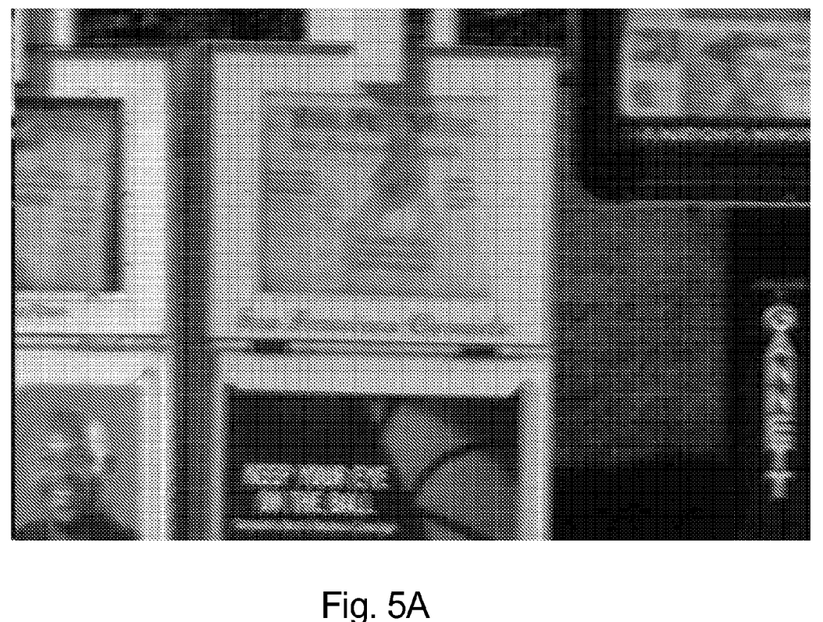
FIG. 5A illustrates a blurry image with noise.
Figure 5B:
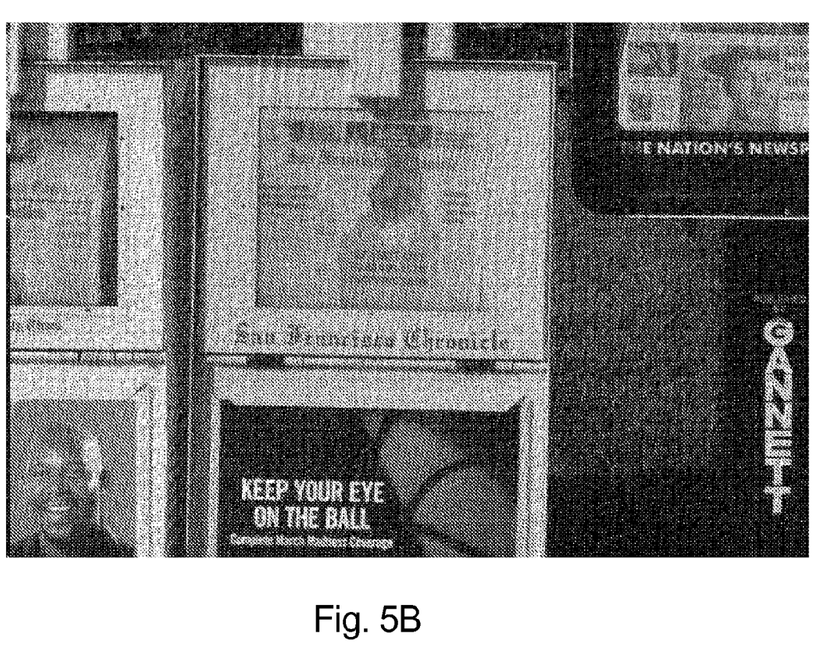
FIG. 5B illustrates a deblurred image that was deblurred using a prior art method.

FIG. 5A illustrates a blurry image that includes noise, namely 20 dB Gaussian noise. FIG. 5B illustrates a deblurred image (of that shown in FIG. 5A) that was deblurred using a prior art method. In FIG. 5B, the deblurred image includes 3.51 dB of noise. The deblurred image noise level is measured with respect to the original sharp image and thus includes reconstruction error.

Figure 5C:
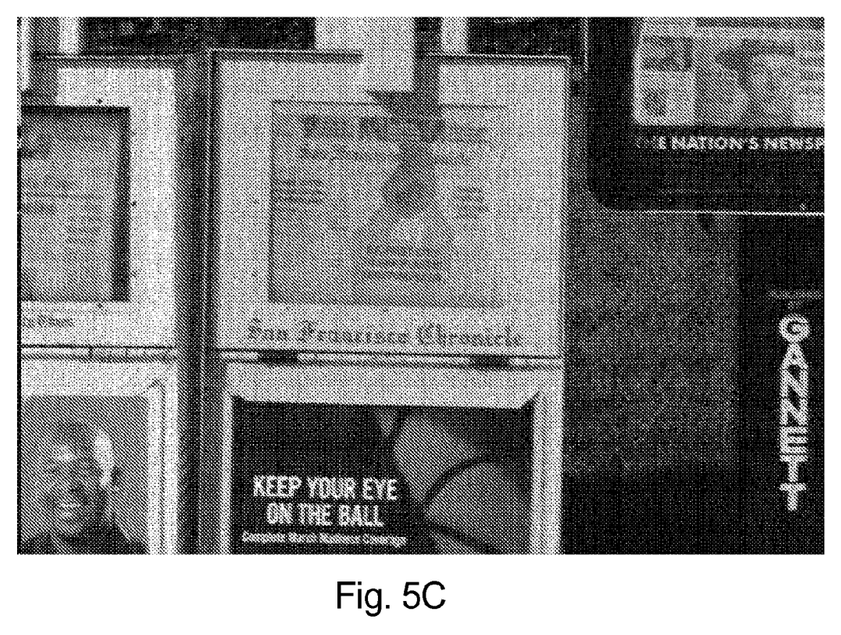
FIG. 5C illustrates one embodiment of a spatial mask.

FIG. 5C illustrates one embodiment of a spatial mask that can be used during deblurring of the blurry image illustrated in FIG. 5A. In this embodiment, the white areas of the spatial mask represent a value of one (1), the black areas in the spatial mask represent a value of zero (0), and the gray areas in the spatial mask represent a value between zero (0) and one (1). The spatial mask can be created automatically using an edge detection algorithm. Further, the spatial mask can be used in either or both the PSF and the latent sharp image estimation cost functions. In this embodiment, the edge pixels that captured edges in the blurry image were identified and were given a value of zero (0), while the smooth pixels that captured smooth regions of the blurry image were given a value of one (1).

Figure 5D:
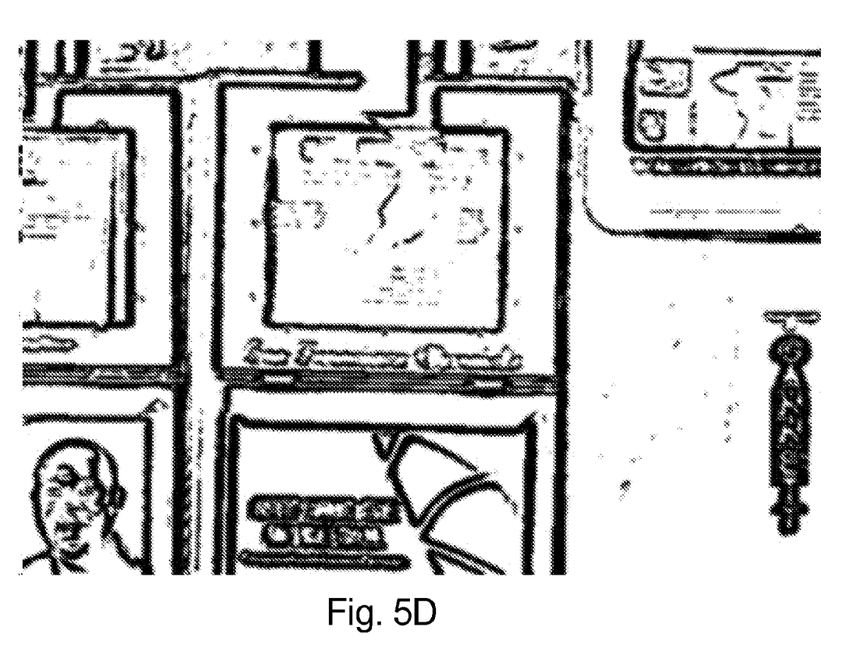
FIG. 5D illustrates a deblurred image that was deblurred using the spatial mask in the regularization term.

FIG. 5D illustrates a deblurred image (of that shown in FIG. 5A) that was deblurred using the spatial mask illustrated in FIG. 5C in the regularization term in either or both the PSF and the latent sharp image estimation cost functions. In FIG. 5D, the deblurred image includes 7.89 dB of noise. The deblurred image noise level is measured with respect to the original sharp image and thus includes reconstruction error.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating a latent sharp image for at least a portion of a blurry image, the method comprising the steps of:
   estimating the latent sharp image with a control system that includes a processor (i) utilizing a first spatial mask in a fidelity term and a second spatial mask in a regularization term of a latent sharp image estimation cost function, the first spatial mask being a first array of individual weights for individual pixels in the fidelity term and the second spatial mask being a second array of individual weights for individual pixels in the regularization term, and
   (ii) utilizing a variable splitting technique in both the fidelity term and the regularization term during minimization of the latent sharp image function with the control system, the variable splitting technique including introducing a first auxiliary variable and a first penalty term into the fidelity term of the latent sharp image estimation cost function and introducing a second auxiliary variable and a second penalty term into the regularization term of the latent sharp image estimation cost function to split the operations of convolution and element-wise multiplication by the control system.

2. The method of claim 1 wherein the step of utilizing a variable splitting technique includes minimization of the latent sharp image estimation cost function over an unknown latent sharp image L and the first auxiliary variable in an alternating fashion.

3. The method of claim 2 wherein the step of utilizing a variable splitting technique includes minimization of the latent sharp image estimation cost function using fast Fourier transform.

4. The method of claim 1 wherein the step of utilizing a variable splitting technique includes minimization of the latent sharp image estimation cost function using fast Fourier transform.

5. The method of claim 1 further comprising the step of estimating a PSF kernel with the control system (i) utilizing a third spatial mask in a regularization term of a PSF cost function used for the PSF kernel estimation of the blurry image, and (ii) utilizing a variable splitting technique during minimization of the PSF cost function with the control system, the variable splitting technique including introducing a second auxiliary variable and a second penalty term into the regularization term of the PSF estimation cost function.

6. The method of claim 5 wherein the step of utilizing a variable splitting technique during minimization of the PSF estimation cost function includes minimization over an unknown PSF kernel K and the second auxiliary variable in an alternating fashion.

7. The method of claim 6 wherein the step of utilizing a variable splitting technique during minimization of the PSF cost function includes using fast Fourier transform.

8. The method of claim 1 further comprising the step of capturing the blurry image with an image apparatus that includes the control system.

9. The method of claim 1 further comprising the step of capturing the blurry image with an image apparatus and transferring the image to a computer that includes the control system.

10. A method for estimating a PSF blur kernel of at least a portion of a blurry image, the method comprising the steps of:
   estimating the PSF kernel with a control system that includes a processor (i) utilizing a first spatial mask in a regularization term of a PSF cost function, the first spatial mask being an array of individual weights for individual pixels in the regularization term, and (ii) utilizing a variable splitting technique during minimization of the PSF cost function with the control system, the variable splitting technique including introducing a first auxiliary variable and a first penalty term into the PSF estimation cost function to split the operations of convolution and element-wise multiplication by the control system.

11. The method of claim 10 wherein the step of utilizing a variable splitting technique during minimization of the PSF estimation cost function includes minimization over an unknown PSF blur kernel and the first auxiliary variable in an alternating fashion.

12. The method of claim 11 wherein the step of utilizing a variable splitting technique includes minimization of the PSF estimation cost function using fast Fourier transform.

13. The method of claim 10 wherein the step of utilizing a variable splitting technique includes minimization of the PSF estimation cost function using fast Fourier transform.

14. The method of claim 10 wherein the PSF estimation cost function includes a fidelity term in addition to the regularization term.

15. The method of claim 10 wherein the PSF estimation cost function is a modified regularized least squares cost function that includes one or more fidelity terms and one or more regularization terms.

16. The method of claim 10 further comprising the step of utilizing a second spatial mask in the fidelity term of the PSF cost function.

17. The method of claim 16 wherein the step of utilizing a variable splitting technique during minimization of the PSF cost function includes introducing a second auxiliary variable and a second penalty term into the fidelity term of PSF estimation cost function.

18. The method of claim 10 further comprising the step of capturing the blurry image with an image apparatus that includes the control system.

19. The method of claim 10 further comprising the step of capturing the blurry image with an image apparatus and transferring the image to a computer that includes the control system.

\* \* \* \* \*